(12) United States Patent
Kuehmann et al.

(10) Patent No.: US 10,427,380 B2
(45) Date of Patent: Oct. 1, 2019

(54) METHODS OF MANUFACTURING CORROSION RESISTANT BIMETAL PARTS AND BIMETAL PARTS FORMED THEREFROM

(71) Applicant: Apple Inc., Cupertino, CA (US)

(72) Inventors: Charles J. Kuehmann, Los Gatos, CA (US); Christopher M. Werner, San Jose, CA (US); Colin M. Ely, Sunnyvale, CA (US); James A. Wright, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 151 days.

(21) Appl. No.: 15/159,573

(22) Filed: May 19, 2016

(65) Prior Publication Data

US 2016/0339540 A1 Nov. 24, 2016

Related U.S. Application Data

(60) Provisional application No. 62/163,868, filed on May 19, 2015.

(51) Int. Cl.
*H01B 1/02* (2006.01)
*B32B 15/01* (2006.01)
(Continued)

(52) U.S. Cl.
CPC .............. *B32B 15/013* (2013.01); *C23C 2/04* (2013.01); *H01B 1/02* (2013.01); *B23K 2103/05* (2018.08); *B23K 2103/08* (2018.08)

(58) Field of Classification Search
CPC ...... B22F 3/1216; B22F 7/08; B22F 2998/00; B22F 2999/00; B22F 2998/10; B22F 2201/20; B22F 1/0003; B22F 3/24; B22F 5/106; B22F 7/04; B22F 2202/11; B22F 2207/01; B22F 3/004; B22F 3/10; B22F 3/15; B22F 3/16; B22F 7/008; B22F 2005/103; B22F 2007/066; B22F 2301/10; B22F 2301/15; B22F 2301/205; B22F 2301/35; B22F 2302/10; B22F 2302/253; B22F 2302/45; B22F 3/1241; B22F 3/1258; B22F 3/14; B22F 3/20; B22F 7/06; B22F 7/062; B22F 3/1266; C22C 14/00; C22C 1/0433; C22C 19/058; C22C 32/0047; C22C 33/02; C22C 38/22; C22C 38/36;
(Continued)

(56) References Cited

U.S. PATENT DOCUMENTS 3,598,156 A * 8/1971 Ulmer ................... F16L 9/02
138/140
3,658,488 A * 4/1972 Brown .................... C25D 5/12
428/613
(Continued)

*Primary Examiner* — Mark Kopec
*Assistant Examiner* — Jaison P Thomas
(74) *Attorney, Agent, or Firm* — Polsinelli PC

(57) ABSTRACT

The methods including applying a corrosion resistant alloy to a metal substrate to create a bimetal blank. The bimetal blank can undergo a variety of shaping and machining operations to form the net shape and internal structures of the part. Further, the part can undergo a finishing operation (e.g. polishing) to create the desired cosmetic appearance on the exterior surfaces and remove any surface imperfections resulting from the shaping and machining operations.

9 Claims, 3 Drawing Sheets

(51) Int. Cl.
*C23C 2/04* (2006.01)
*B23K 103/04* (2006.01)
*B23K 103/08* (2006.01)

(58) Field of Classification Search
CPC ..... C22C 38/38; C22C 19/002; C22C 19/005; C22C 19/03; C22C 19/055; C22C 19/056; C22C 19/057; C22C 19/07; C22C 1/045; C22C 1/1015; C22C 29/02; C22C 33/00; C22C 33/0292; C22C 38/04; C22C 9/01; C22C 9/06; C22C 9/10; B21C 37/154; B21C 1/22; B21C 23/085; B21C 23/22; B23K 2103/05; B23K 2103/08; B32B 15/013; C23C 2/04; H01B 1/02
See application file for complete search history.

(56) References Cited

U.S. PATENT DOCUMENTS

| | | | | |
|---|---|---|---|---|
| 4,464,209 | A | * | 8/1984 | Taira ........................ C21D 9/14 148/521 |
| 4,647,749 | A | * | 3/1987 | Koshy .................... B23K 9/048 137/375 |
| 4,844,863 | A | * | 7/1989 | Miyasaka ................. B22F 7/04 419/8 |
| 4,966,748 | A | * | 10/1990 | Miyasaka ............. B22F 3/1266 419/20 |
| 5,891,191 | A | | 4/1999 | Stinson |
| 6,691,397 | B2 | * | 2/2004 | Chakravarti .......... B21C 23/085 29/421.1 |
| 6,726,993 | B2 | | 4/2004 | Teer et al. |
| 7,217,678 | B2 | | 5/2007 | Rao et al. |
| 8,066,778 | B2 | | 11/2011 | Meridew et al. |
| 2003/0231973 | A1 | * | 12/2003 | Krumpelt .............. B22F 3/1137 419/8 |
| 2011/0239725 | A1 | * | 10/2011 | Du .......................... B29C 45/14 72/342.3 |

* cited by examiner

METHODS OF MANUFACTURING CORROSION RESISTANT BIMETAL PARTS AND BIMETAL PARTS FORMED THEREFROM

CROSS-REFERENCE TO RELATED APPLICATIONS

The present application claims the benefit under 35 U.S.C. § 119(e) of U.S. Provisional Patent Application No. 62/163,868, entitled "Methods of Manufacturing Corrosion Resistant Bimetal Parts and Bimetal Parts Formed Therefrom," filed on May 19, 2015, which is incorporated herein by reference in its entirety.

FIELD

The disclosure is directed to methods of constructing bimetal parts using a metal substrate and a corrosion resistant coating. More particularly, various embodiments relate to the application of a corrosion resistant alloy containing chrome to a metal substrate, such as an austenitic stainless steel, for creating a bimetal part.

BACKGROUND

Many devices, e.g. portable consumer electronics such as cellphones, media players, and watches, include housings formed from structurally strong and stiff materials such as stainless steel. The strength provided by materials such as stainless steel enables the housings to protect internal components of the consumer electronics, and enhances the durability of such devices.

In some applications, while stainless steel provides desirable strength characteristics for housings, the stainless steel may not provide acceptable cosmetic characteristics. For example, a polished stainless steel surface is often relatively easy to scratch, and a scratched stainless steel surface may be unappealing. Additionally, stainless steel can be at risk of corrosion at or near locations of laser etching. This is because laser etching can cause localized melting of the stainless steel, which can lead to localized regions of lean chrome content and high chrome content when the stainless steel re-solidifies. The lean chrome regions can be susceptible to corrosion.

In order to maintain the look and feel of the stainless steel, while also preventing corrosion in consumer electronic housings, it may be desirable to protect the stainless steel or other metal surface of the housing from damage that would adversely affect outward appearance. Furthermore, it may be desirable that the protection provided to the stainless steel surface does not substantially adversely affect the look and feel of the device.

SUMMARY

Described herein are methods of constructing a metal part and bimetal parts made therefrom. In some embodiments, the part can comprise a housing for use in portable electronic devices. The method, in some embodiments, includes applying a corrosion resistant alloy to a metal substrate to create a bimetal blank. The bimetal blank can undergo a variety of shaping and machining operations to form the net shape and internal structures of the part. Further, the part can undergo a finishing operation (e.g. polishing) to create the desired cosmetic appearance on the exterior surfaces and remove any surface imperfections resulting from the shaping and machining operations.

In some embodiments, a corrosion resistant alloy can be applied to a metal substrate to create a bimetal blank. The bimetal blank can undergo a shaping operation to create a preform having the shape (i.e. external geometry) of the final part. The preform can be subjected to a machining operation to create internal structures and the net-shape to create the bimetal part. The bimetal part can further be processed in a finishing operation to create the desired cosmetic appearance on external surfaces. In some embodiments, the metal substrate can be a stainless steel and the corrosion resistant coating can be a cobalt-chrome alloy.

In other embodiments, a metal substrate can undergo a shaping operation to create a preform having the external geometry of a part (for example, a housing for an electronic device). A corrosion resistant coating can be applied to the preform to create a bimetal preform. The bimetal preform can be subjected to a machining operation to create internal structures and the net-shape to create the bimetal part. The bimetal part can further be processed in a finishing operation to create the desired cosmetic appearance on external surfaces. In some embodiments, the metal substrate can be a stainless steel and the corrosion resistant coating can be a cobalt-chrome alloy.

In other embodiments, a part for an electronic device can comprise a metal substrate and a corrosion resistant coating, where the coating comprises at least 20% chrome by weight percent. In some aspects, the coating can have a hardness of at least 500 HV.

In another embodiment, the bimetal part can comprise a stainless steel substrate and a cobalt-chrome alloy coating, where the alloy coating has a chrome content of at least 20% weight fraction. In some embodiments, the cobalt-chrome alloy coating has a hardness of at least 500 HV.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1:
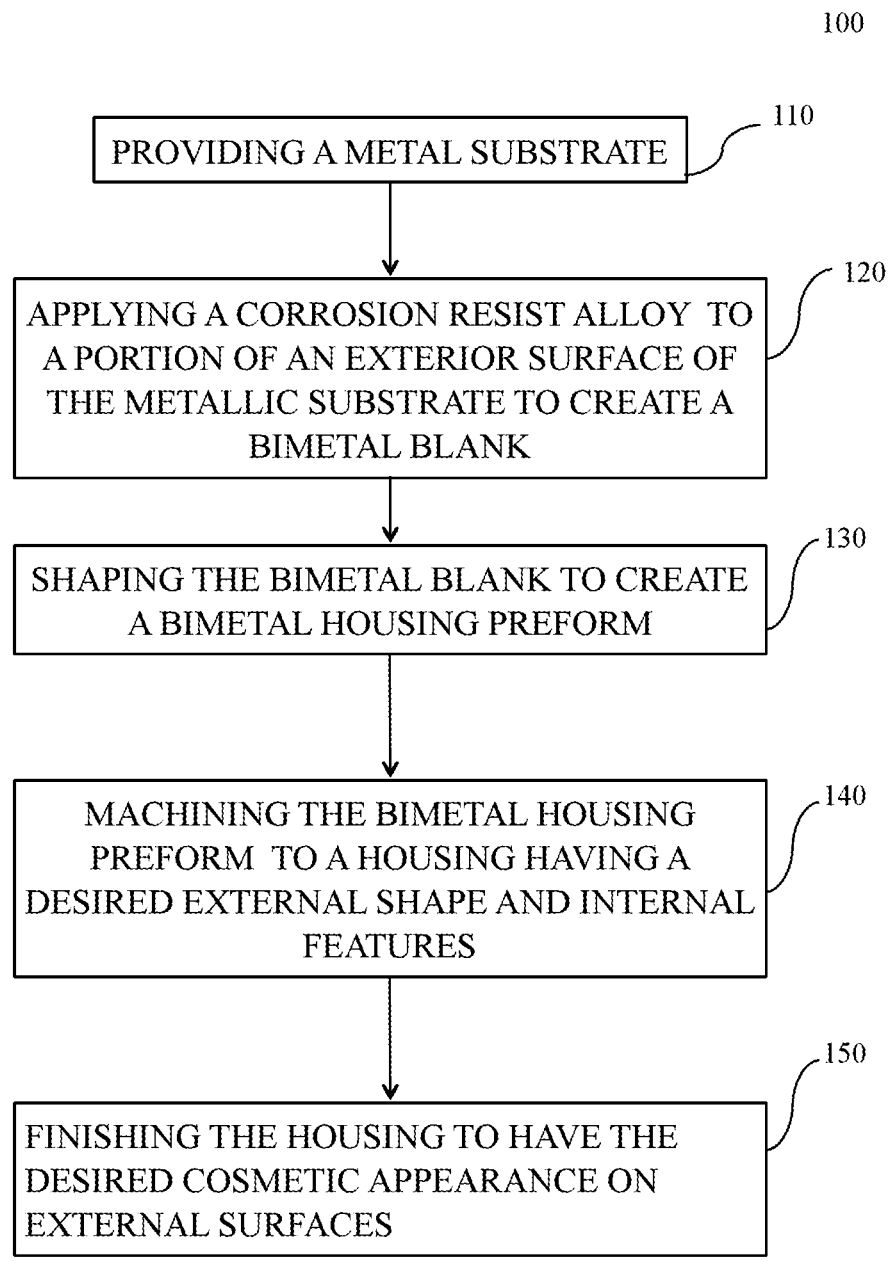
FIG. 1 illustrates a process for creating a bimetal part.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following disclosure relates to methods of manufacturing a bimetal part with a corrosion resistant coating. In some embodiments, the parts can be used, for example, in the manufacture of portable consumer electronic products and housings made therefrom. For example, housings for portable electronic devices are frequently made from stainless steel blanks as described herein. Various austenitic stainless steels can have low scratch resistance on cosmetic (i.e. exterior) surfaces and/or high corrosion risk near locations of laser etching/welding. For example, because laser etching can cause localized melting of the stainless steel, which can lead to localized regions of lean chrome content and high chrome content when the stainless steel re-solidifies. The lean chrome regions can be susceptible to corrosion.

The described embodiments provide a corrosion and/or scratch resistant coating or layer on a metal substrate used for manufacturing of parts. In some embodiments, the parts can be housings, cases or frames for portable electronic devices. In addition to providing a durable and/or hard surface that is scratch and/or corrosion resistant, the coating can have a surface color and texture that is also aesthetically pleasing. For example, in some embodiments, the corrosion resistant coating can be a cobalt-chrome alloy. In other embodiments, the corrosion resistant coating can be a braze alloy. In still other embodiments, the corrosion resistant coating can be any suitable alloy that provides corrosion resistance. In yet other embodiments, the corrosion resistant coating can be an alloy containing chrome with a concentration of at least 20 weight percent. In some other embodiments, the corrosion resistant coating can be a bulk metallic glass.

Various embodiments relate to products and methods to provide a corrosion resistant coating on a metal substrate. In one embodiment, a cobalt-chrome alloy can be applied as a coating on a stainless steel substrate. The strength associated with stainless steel is generally desirable in formation of parts, including housings, cases, or frames for portable electric devices including, but not limited to, cellphones, portable digital assistants, digital media players, and watches. The stiffness associated with stainless steel is desirable. The stainless steel, however, may have only moderate scratch and corrosion resistance. The cosmetic surface of the stainless steel may also be limited. As such, a corrosion resistant coating with a high hardness (e.g. hardness of at least 300 HV) can be applied to the metal substrate to provide additional scratch and corrosion resistance. In some variations, the hardness is greater than 400 HV. In some variations, the hardness is greater than 450 HV. In some variations, the hardness is greater than 500 HV.

To provide a surface that is scratch and corrosion resistant, a corrosion resistance layer (e.g. a cobalt-chrome alloy) can be provided to at least a portion of a surface of a part. In some variations, the corrosion resistant layer can be a cobalt-chrome coating applied to a stainless steel substrate. In other embodiments, a metal substrate can be sandwiched between two corrosion resistant layers. By way of example, without intending to be limiting, in some embodiments, a stainless steel substrate may be sandwiched between two layers of cobalt-chrome. In addition to providing a durable and/or hard surface that is scratch and/or corrosion resistant the cobalt-chrome alloy coating can have a natural surface color and texture that is aesthetically pleasing and provides a desirable cosmetic appearance for an electronic device.

These and other embodiments are discussed below with reference to FIGS. 1-3B. However, those skilled in the art will readily appreciate that the detailed description given herein with respect to these Figures is for explanatory purposes only and should not be construed as limiting.

FIG. 1 illustrates a process 100 of forming a part for a portable electronic device that includes a metal (e.g. stainless steel) substrate and at least one corrosion resistant (e.g. cobalt-chrome alloy) layer. The process 100 of forming the part begins at step 110 in which a metal substrate (also sometimes referred to as a blank) which is used to form the part is obtained. A corrosion resistant alloy (e.g. a cobalt-chrome alloy layer) is applied to at least a portion of a surface of the substrate (e.g. a stainless steel sample) in step 120 to create a bimetal blank. In one embodiment, in step 120, a cobalt-chrome alloy is clad or otherwise bonded to at least a portion of a surface of the stainless steel substrate to form a bimetal blank. In step 130, the bimetal blank (e.g., a cobalt-chrome coated stainless steel substrate) can undergo a shaping operation to form the overall geometry (i.e. the overall exterior shape) of the part, thereby creating a preform. After a shaping operation, the bimetal preform can be machined to form internal features and further shaped to form the net shape of the final part in step 140. After machining, in step 150, the part can undergo a finishing process, such as polishing, to obtain the desired cosmetic appearance on the exterior surfaces of the part.

In step 110, a metal substrate that is suitable for use as a part in a portable electronic device is obtained. Since many functions of consumer electronic devices rely on electromagnetic (EM) waves in the radio frequency spectrum (WiFi, bluetooth, or cellular, for example), it is important that any structural component, such as a housing, case or frame, not be a source of EM interference. Therefore, it is contemplated that the metal substrate is non-magnetic. The metal substrate can be an austenitic stainless steel or other metal that is suitable for shaping and has hardness of at least 150 HV. In some variations, the hardness of the metal substrate can be greater than 200 HV. In some variations, the hardness of the metal substrate can be greater than 250 HV. In still some variations, the hardness of the metal substrate can be greater than 3000 HV. For example, in some embodiments, the metal substrate can be a stainless steel blank. For example, the metal substrate can be a 300 series stainless steel such as 301, 302, 303, 304, 304L, 316, 316L or any other 300 series austenitic stainless steel. In other embodiments, the metal substrate can be a 400 series stainless steel or other suitable type of stainless steel. In still other embodiments, the metal substrate can be tungsten, brass, and other suitable non-magnetic metals that have a suitable hardness and/or are suitable for shaping.

Figure 2:
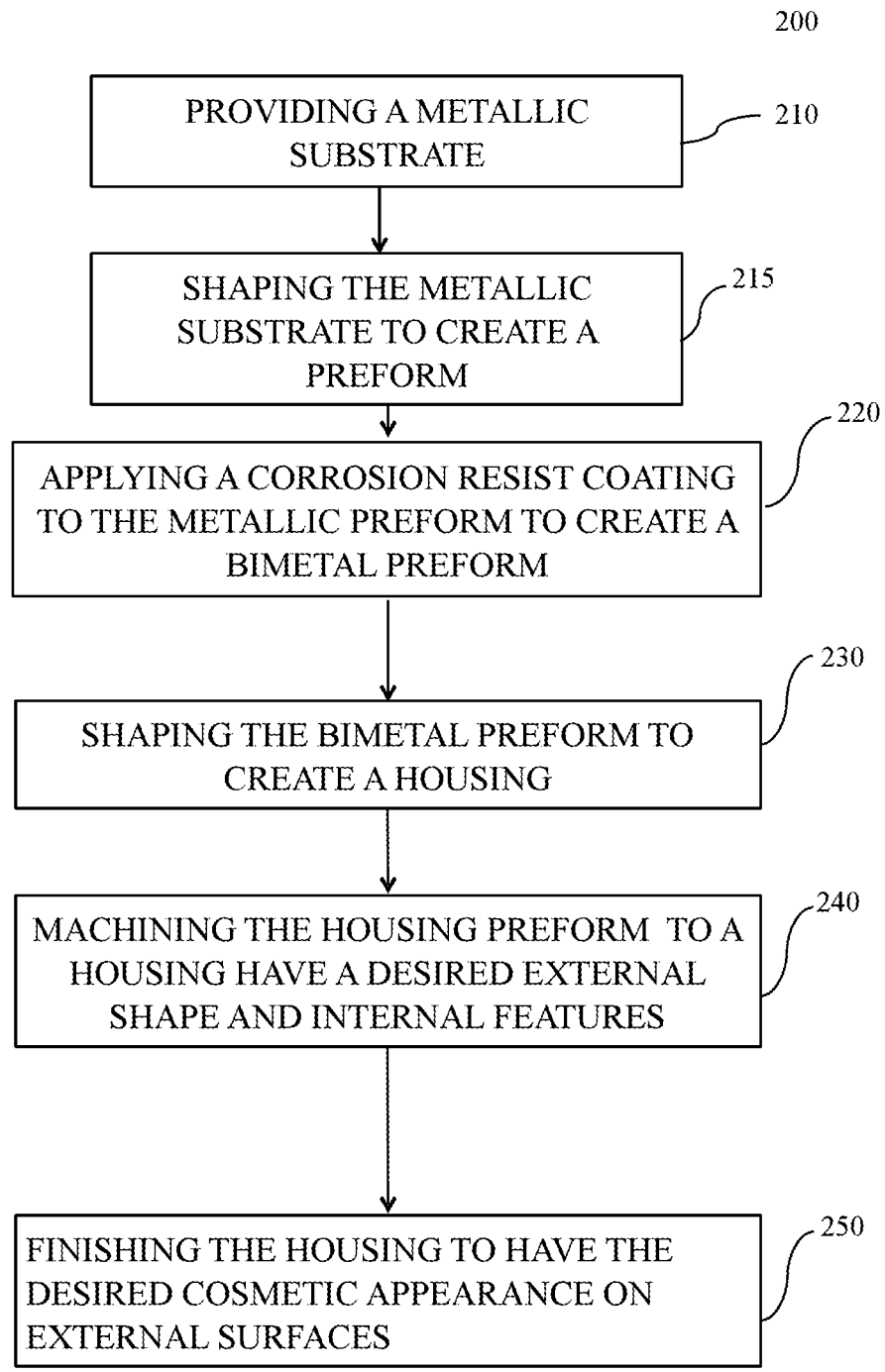
FIG. 2 illustrates another embodiment of a process for creating a bimetal part.

The metal substrate can be any shape. In some embodiments, the metal substrate may be a sheet. In other embodiments, the metal substrate may be a rod. In still further embodiments, as illustrated in FIG. 2, the metal substrate can be partially shaped into the geometry of the final part so to create a preform to which the corrosion resistant coating is applied. For example, in some embodiments, the metal substrate can undergo a shaping operation such as forging prior to applying the corrosion resistant alloy. The metal preform can more closely approximate the exterior dimensions and shape of the part. In such embodiments, the corrosion resistant alloy is applied to a partially shaped substrate (i.e. the metal preform). In other embodiments, a metal preform can be created using a metal injection molding (MIM) process. A MIM operation can be used to reduce the amount of material that is removed in the shaping and machining operations, as well as reduce the need for multiple shaping and operations. Thereby, the overall manufacturing costs and time can be reduced.

Referring to FIG. 1, in step 120, the corrosion resistant coating can be applied to a portion of an exterior surface of the metal substrate or metal preform. In some embodiments, the coating can be applied to a top surface and a bottom surface of the metal substrate such that the metal substrate is sandwiched between two layers of the corrosion resistant coating. In other embodiments, the corrosion resistant coating can be applied to each external surface of the metal substrate.

The corrosion resistant coating can be applied using a number of techniques that are described in detail below. The corrosion resistant coating can be a cobalt-chrome alloy, a braze alloy, other alloys containing at least 20% weight chrome, a bulk metallic glass, or other suitable corrosion resistant alloy. In various embodiments, corrosion resistant coating can be an alloy with a hardness of at least 400 HV. For example, in some embodiments, the corrosion resistant alloy can be a commercial available cobalt-chrome alloy such as, including but not limited to, Ultimet®, ASTM F75, L605, or other suitable alloy.

The corrosion resistant coating can be applied, in step 120, using a variety of techniques, such as hot dipping, spraying, roll cladding, or any other suitable coating process.

For example, in one embodiment, the corrosion resistant alloy can be applied via a hot dipping process. In a hot dipping process, the metal substrate can be immersed in a molten alloy bath to coat the metal substrate or metal preform. As the substrate or preform is cold, the molten alloy will solidify on the surface(s) of the substrate or preform. When a hot dipping process is used, a corrosion resistant alloy with a melting temperature lower than the material of the metal substrate or preform should be selected. Selecting a corrosion resistant alloy with a lower melting temperature can prevent the metal substrate or preform from melting when immersed in the molten alloy bath. In other embodiments, the corrosion resistant alloy can be applied using coating processes, including spray coating, electro-plating, thermal spraying, physical vapor deposition (PVD) processes, or other suitable coating process. By way of example, without intending to be limiting, a cobalt-chrome alloy can be applied to a stainless steel substrate using a spray coating process in some embodiments. A molten cobalt-chrome alloy can be atomized by passing through a steam of gas (e.g. argon) and through a nozzle to impact a surface of the substrate. When the atomized cobalt-chrome contacts the surface of the substrate, it solidifies and bonds to the substrate creating the corrosion resistant coating.

In still other embodiments, in step 120, the corrosion resistant coating can be applied to the metal substrate using a laminating process. A laminating process may be any process which allows a layer of material to be bonded to a metal substrate without the use of an intermediate bonding agent. That is, a laminating process may be arranged to allow a layer of material to be bonded directly to the metal substrate. A laminating process may, for example, be a cladding process. As will be understood by one of skill in the art, cladding is the bonding of metals without an intermediate bonding agent and without substantially remelting the metals. Cladding may take a variety of different forms including, but not limited to including, a sheet of a cobalt-chrome alloy can be affixed to a top surface of the metal substrate. A layer of the cobalt-chrome alloy and the metal substrate (e.g. stainless steel sheet) are pressed together with a roller under high pressure in a standard roll clad process. In other embodiments, a find cladding process can be used in which a layer of the corrosion resistant material and the metal substrate are placed in a vacuum and rolled together after a chemical process is performed. In yet other embodiments, the cladding process can be used to apply the corrosion resistant coating to a top surface and a bottom surface of the metal substrate to create the sandwich structure.

The corrosion resistant coating should be applied to have a sufficient thickness that there is remaining coating after the bimetal blank is shaped and machined to form the part. In some embodiments, the coating can have a thickness of at least 10 μm. In other embodiments, the coating can have a thickness of at least 100 μm. In other embodiments, the coating can have a thickness of at least 500 μm. In still other embodiments, the coating can have a thickness of at least 1000 μm. In some embodiments, the coating can have a thickness of less than 1 mm. In other embodiments, the coating can have a thickness of less than 0.1 mm.

Figure 3A:
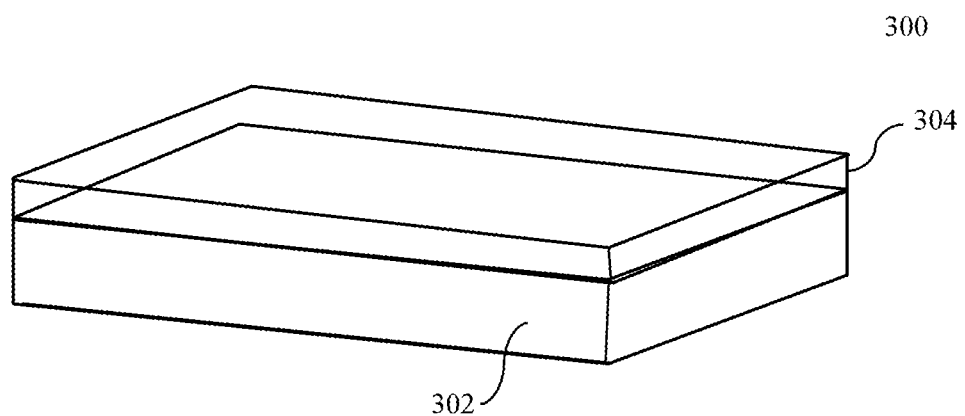
FIG. 3A shows a bimetal blank with a metal substrate and a corrosion resistant coating prior to a shaping operation.
Figure 3B:
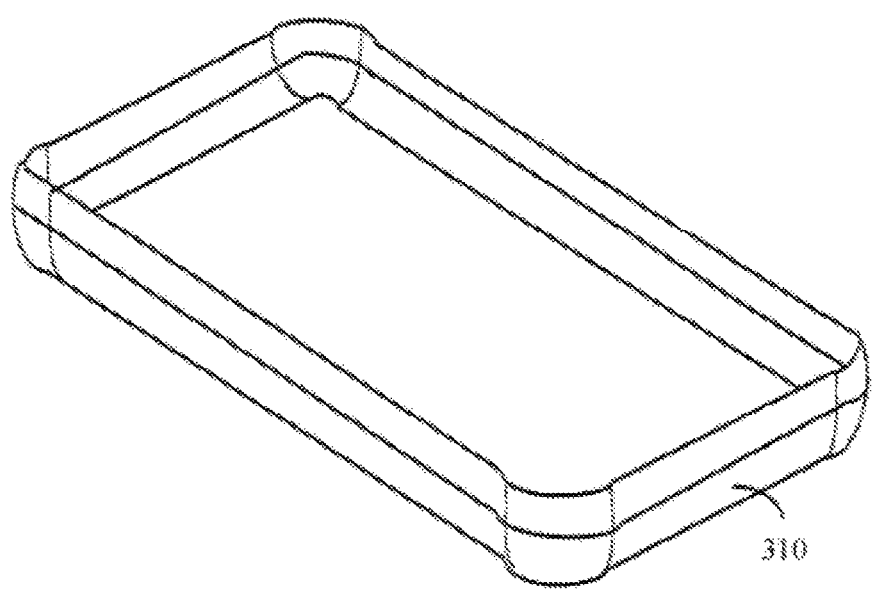
FIG. 3B shows the bimetal blank of FIG. 3A being partially shaped into a preform.

After the corrosion resistant alloy coating (e.g. cobalt-chrome alloy or high chrome braze alloy) is applied to the metal substrate to create a bimetal blank, the bimetal blank can be shaped in step 130 to create a preform. In the disclosure, a preform refers to a partially shaped metal substrate that generally has the exterior geometry of the final part, but is still further machined to obtain the external dimensions and internal features of a finished part. As illustrated in FIGS. 3A-B, the bimetal blank 300 comprises the metal substrate 302 (such as a stainless steel sheet) with the corrosion resistant coating 304 (e.g. cobalt-chrome coating), which can be partially shaped to have sidewalls and resemble an open-sided box to create a preform 310. While preform 310 is depicted to an open-sided box geometry, the illustration is by way of example and not intended to be limiting. The preform can take on any desired shape that is suitable for contain or otherwise restraining the components of a portable electronic device.

The metal substrate can be shaped to create a preform using a variety of operations. In step 130, a variety of shaping techniques can be used to shape the bimetal blank 300 into the preform 310. In one embodiment, the bimetal blank can be shaped by a forging process. In various embodiments, the bimetal blank can be shaped using impression die forging, cold forging, open die forging, roll forging, precision forging, or any other suitable shaping process.

During shaping step 130, in some embodiments the bimetal blank can be shaped during multiple forging processes to create the overall exterior geometry of the part. In some embodiments, the bimetal blank can undergo a first (e.g. rough) forging process to form the overall exterior geometry of the final part. Then undergoes a second (e.g. fine) forging step to further shape the part to further approximate net-shape (e.g. exterior dimensions) of a finished part.

In other embodiments, the bimetal blank can be shaped in a single precision forging process (also referred to as net-shape or near-net shape forging) to create a near-net shaped part and reduce the need additional machining to create the finished part. Additionally, precision forging reduces material waste and minutes the time and costs associated with the post-forging machining operations.

In other embodiments as depicted in FIG. 2, the metal substrate can also be partially shaped into the preform before the corrosion resistant coating is applied in step 215. By way of example, without intending to be limiting, the metal substrate can be shaped into a preform, having a geometry similar to the same as bimetal preform 310, in step 215 and then the corrosion resistant coating can be applied, in step 220, to the metal preform.

As illustrated in FIG. 2, the metal substrate can undergo a rough shaping process prior to application of the corrosion resistant coating. In yet other embodiments, a MIM process can be used to form a metal substrate that is preformed such that it substantially has the same exterior geometry of the final bimetal part. If the metal substrate is roughly shaped to create the general geometry of the final part, the corrosion resistant coating can be selectively applied to portions of surfaces that would be susceptible to corrosion. By applying the corrosion resistant coating to these portions, corrosion can be prevented.

For example, in some embodiments, a stainless steel rod or sheet can be partially shaped, in step 215, before the corrosion resistant coating (e.g. a cobalt-chrome layer) is applied. The stainless steel blank can undergo a rough forging process to form the overall shape of the part and act as a preform. Then, the corrosion resistant coating (for example, a cobalt-chrome layer) can be applied to the roughly shaped preform in step 220. After applying the corrosion resistant coating (such as a cobalt-chrome layer), the coated preform can be further shaped in a fine forging process in step 230.

After shaping in step 130 or 230, the bimetal preform can further undergo a machining operation in step 140 or 240. During the machining step, the bimetal preform can be further shaped to create the internal features of the part and the external net-shape (i.e. the final external dimensions). The preform can be machined using a lathe, milling machine, drill or any other suitable machining technique to create the part with internal structures. For example, in one embodiment, the bimetal blank can be machined to create a housing for a watch and a milling machine can be used to create slots in the housing in which a band can be attached to create the watch. In other embodiments, the internal structures can include screw threads, flanges, detents, notches, or any other desired internal structure.

In other embodiments, the machining step may involve machining the external surfaces of the bimetal preform to create the net shape of the final part. For example, without intending to be limiting, a lathe can be used to remove excess material and shape the preform into a near net shaped part. In the disclosure, near net shaped in some embodiments means that the external dimensions are within a tolerance of 0.005 mm of the final dimensions. In the disclosure, near net shaped in some embodiments means that the external dimensions are within a tolerance of 0.001 mm of the final dimensions. In other embodiments, near net shaped means the eternal dimensions are within a tolerance of 0.0005 mm of the dimensions of the final part. In other embodiments, near net shaped means the eternal dimensions are within a tolerance of 0.0001 mm of the dimensions of the final part. In other embodiments, near net shaped means the external dimensions are within a tolerance of 0.025 mm of the dimensions of the final part. In still other embodiments, near net shaped means the external dimensions are within a tolerance of 0.1 mm of the dimensions of the final part.

After machining step 140 or 240, the part can undergo a finishing operation in step 150 or 250. The finishing step 150 or 250 can include any number and combination of finishing operations. Such finishing operations can include, for example, but are not limited to, polishing, buffing, and any other suitable technique known to one of skill in the art.

In some embodiments, cobalt-chrome coated stainless steel, which has been shaped into a part with a desired external shape and internal features, can undergo a finishing step to remove surface defects that may have been introduced during the shaping and machining steps. For example, the finishing process can be used to smooth out the surface of the corrosion resistant coating without affecting the scratch and corrosion resistance properties of the coating. In other embodiments, the finishing process can also be used to remove any burrs that resulted from the machining, as well as evening out any thickness variations in the corrosion resistant coating In some embodiments, it is anticipated that the finishing process can remove about 10% of the corrosion resistant coating. For example, if the corrosion resistant coating has a thickness of 50 µm, then approximately 5 µm can be removed during the finishing step. Therefore, once the finishing process is complete, the remaining polished corrosion resistant coating can be substantially free of surface defects and can have an essentially uniform thickness so it is smooth to the touch of a user, while retaining the desired properties of scratch and corrosion resistance. In other embodiments, the finishing process can remove less than 10% of the corrosion resistant coating. In some embodiments, the finishing process can include a final polishing step that may remove approximately 1 µm from the surface to leave a surface that is substantially free of defects (e.g. may only have a surface roughness of a fraction of a µm).

In various embodiments, the bimetal parts with the corrosion resistant coating can be used as a housing, casing or frame for an electronic device, such as, for example, cell phones, desktop computers, laptop computers, and/or portable music players. In some embodiments, the bimetal part can also be used as a housing, casing or frame for electronic device such as a digital display, a monitor, an electronic-book reader, a portable web-browser, and a computer monitor. In other embodiments, the bimetal part can also be used as a casing or frame for an entertainment device, including a portable DVD player, DVD player, Blue-Ray disk player, video game console, or music player, such as a portable music player. The bimetal part can also be part of a computer or its accessories, such as the hard driver tower housing or casing, or laptop housing. The bimetal part can also be applied to a device such as a watch or a clock.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method of forming a metal part, comprising:
   applying to a stainless steel substrate a cobalt chrome corrosion resistant alloy to at least a portion of a surface of the stainless steel substrate to create a bimetal blank, wherein the cobalt chrome corrosion resistant alloy comprises at least 20% chrome by weight;
   shaping the bimetal blank to create a bimetal preform; and
   machining the bimetal preform to form internal structures and an exterior geometry of the bimetal part, wherein the cobalt chrome corrosion resistant alloy has a hardness of at least 300 HV.

2. The method of forming a metal part according to claim 1 further comprising finishing the bimetal part to polish exterior surfaces of the bimetal part.

3. The method of forming a metal part according to claim 1 wherein the step of applying the cobalt chrome corrosion resistant alloy comprises coating the stainless steel substrate with the corrosion resistant alloy.

4. The method of forming a metal part according to claim 1 wherein the step of applying the cobalt chrome corrosion resistant alloy comprises cladding the stainless steel substrate with the cobalt chrome corrosion resistant alloy.

5. A method of forming a bimetal part, comprising:
forming a shaped stainless steel preform;
applying a cobalt chrome corrosion resistant alloy to at least a portion of a surface of the stainless steel preform to create a bimetal preform, wherein the cobalt chrome corrosion resistant alloy comprises at least 20% chrome by weight; and
shaping the bimetal preform to create the bimetal part, wherein the cobalt chrome corrosion resistant alloy has a hardness of at least 300 HV.

6. The method of forming a metal part according to claim 5 wherein the step of forming the shaped stainless steel preform comprises forging, metal injection molding, or combinations thereof.

7. The method of forming a metal part according to claim 5 wherein the step of applying the cobalt chrome corrosion resistant alloy comprises coating the stainless steel preform with the cobalt chrome corrosion resistant alloy.

8. The method of forming a metal part according to claim 5 wherein the step of applying the cobalt chrome corrosion resistant alloy comprises cladding the stainless steel preform with the cobalt chrome corrosion resistant alloy.

9. A metal part comprising:
a stainless steel substrate; and
a cobalt chrome corrosion resistant alloy coating on at least a portion of an exterior surface of the metal substrate; the coating comprising at least 20% chrome by weight percent and having a hardness of at least 300 HV.

* * * * *